United States Patent [19]
Wilke

[11] 3,969,635
[45] July 13, 1976

[54] VOLTAGE CONDITION MONITOR

[76] Inventor: William G. Wilke, 641 E. Dayton St., Madison, Wis. 53703

[22] Filed: Feb. 25, 1974

[21] Appl. No.: 445,339

[52] U.S. Cl. .......................... 307/235 R; 307/235 J; 317/31; 328/261; 340/248 B; 340/248 D; 340/249
[51] Int. Cl.² ...................... H02H 3/24; H02H 7/18
[58] Field of Search ............... 307/235 R, 273, 296, 307/297; 340/248 A, 248 B, 248 C, 248 D, 248 P, 248 Y, 249; 317/31; 328/259, 261

[56] References Cited
UNITED STATES PATENTS

| | | | |
|---|---|---|---|
| 3,166,678 | 1/1965 | Fleshman, Jr. et al. | 340/248 A |
| 3,267,375 | 8/1966 | Olsen | 340/248 A |
| 3,503,062 | 3/1970 | Witzke et al. | 340/248 B |
| 3,611,162 | 10/1971 | Tochitani | 317/31 X |
| 3,735,377 | 5/1973 | Kaufman | 340/248 P |

*Primary Examiner*—John Zazworsky

[57] ABSTRACT

A device for monitoring a variable voltage supply level is disclosed. The monitoring device functions to supply a signal which may be used to shut-down that equipment being supplied and/or drive an indicating device when the voltage level is below a trip voltage and, when the voltage level exceeds the trip voltage to provide a signal which may be used to reconnect the equipment circuit. The monitoring device includes a pair of low power generators each of which produce a digital signal. The digital signal of one generator varies more than the digital signal of the other generator with changes in applied voltage. The two digital signals are compared by a low power circuit and voltage level information is determined.

6 Claims, 3 Drawing Figures

VOLTAGE CONDITION MONITOR

The present invention relates to a voltage monitor. The invention is particularly adapted for monitoring the condition or voltage level of a battery.

BACKGROUND OF THE INVENTION

If a battery of the rechargeable type, such as a nickel-cadmium or manganese alkali battery, to name a few, is permitted to discharge completely, irreparable damage to the battery may result. In view of this the prior art has developed and at the present time many forms of monitoring devices are available to provide an indication, prior to complete discharge, of the condition of the battery serving as a power source of electrical equipment. Also, monitoring may be desirable to obtain information of battery condition so that upon a low supply voltage erroneous information from a powered circuit is not obtained. One such prior art battery monitoring device is disclosed in U.S. Pat. No. 3,550,105, which issued to Rinaldo De Cola and Irving I. Zook on Dec. 22, 1970.

Generally, the De Cola et al. device monitors the voltage of a battery by means of a flashing neon light. The rate of flashing of the light is controlled by the amplitude of voltage across and RC network which is directly proportional to the battery voltage. While devices of this type have been accepted as a means of providing an indication of battery condition, they suffer from the disadvantage that they have no provision to turn off the electrical equipment being supplied by the battery under conditions that the battery voltage falls below a safe operating level. Thus, in the known prior art, active preventive steps must be taken to obviate complete discharge of the battery following any alarm function.

The prior art is considered, also, to provide a further disadvantage, namely, that their monitoring circuits draw current at significant levels and that some devices require manual resetting after a trip condition. Further, some prior art devices require a reference source or device.

BRIEF DESCRIPTION OF THE INVENTION

The present invention overcomes the disadvantages of the prior art and provides a monitoring circuit which draws a low current in all states of battery condition, i.e., when the monitored condition of a battery is either above or below a threshold or trip voltage.

The present invention, also, provides during the period that the monitored condition of the battery is below the threshold voltage an output signal which may be used to shut-down that equipment being supplied by the battery and during the period that the monitored condition of the battery is above the threshold voltage an output signal which may be used to restart the equipment being supplied. Also, the circuit requires no reference source or device which draws a large current for operation. The reference is built into the circuit.

While the description to follow discusses the monitoring circuit as being used to monitor the condition of a battery this description is not to be considered as limiting the utility of the invention for clearly the voltage of any voltage source may be monitored.

As a first aspect the present invention provides a low power monitoring device including a pair of generators each providing a digital signal, one of which varies more than the other upon a variation in a supply voltage, and a comparison circuit for comparing these digital signals to reconstruct determine voltage level information.

The generators may be astable multivibrators whose digital signals are compared or a combination of a astable and a monostable multivibrator, the latter of which is triggered by the former, whose digital signals are compared. The output of the comparison circuit may be used to control the operation of equipment being supplied by the battery and/or control the operation of an indicator. Typically, a D-type flip-flop may be used as a comparison circuit.

As a further aspect of the invention the signal output of the comparison circuit may be used to control a transistor which ensures either a stable low Q of a high Q condition when the battery charge is below and above a trip or threshold condition, respectively.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE DRAWINGS

The drawing forms a part of the present application and by this drawing.

DESCRIPTION OF THE PREFERRED EMBODIMENT

Figure 1:
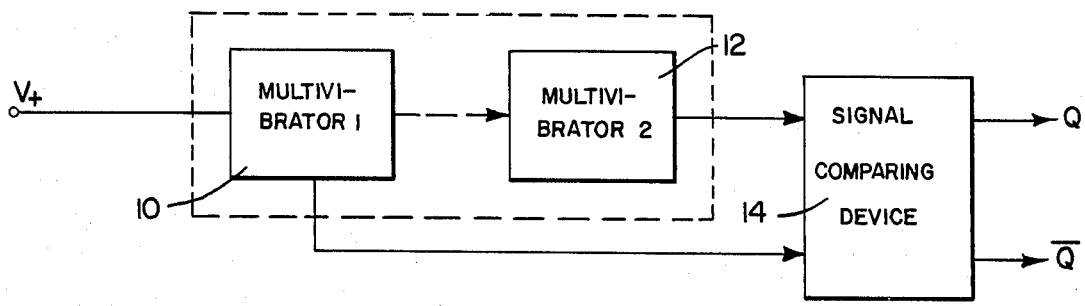
FIG. 1 illustrates a block circuit diagram of the inventive concept.

The present invention in its broadest aspect is illustrated in the block circuit diagram of FIG. 1. To this end, the monitoring circuit may include a first generator 10 having a digital signal output which varies in accordance with a change in an applied voltage, and a second generator 12 also having a digital signal output. The generator 12 is less responsive than is generator 10 to a change in the applied voltage to that its output signal will remain substantially constant rendering it possible to compare the signals and determine voltage level information. The comparison may be carried out by, for example, a comparison circuit 14. The signals produced and compared may be frequencies, pulse widths, or duty cycles, for example.

The figure illustrates two possible modes of operation. To this end, the generators may both be astable multivibrators, or the generator 12 may be a monostable multivibrator which is triggered to operation by generator 10. In addition, there are several different possible comparison circuits.

The generators 10 and 12 as well as the signal comparison device 14 form a low power circuit.

The embodiment of the invention of FIG. 2 follows this concept of operation to provide in a low power circuit an indication of whether the charge on a battery is above or below a threshold voltage. If below a threshold voltage the circuit functions to provide a signal which may be used to turn off that equipment being supplied by the battery or to drive an indicating device. The monitor circuit, also, provides a signal to turn the equipment back on or change the indicating device when the battery is recharged to the trip voltage plus the hysteresis voltage. The trip voltage as the battery charge is going down is different from the trip voltage as the battery charge is increased. The difference in the two is determined by the voltage drop across the resistor connected in parallel to the transistor. The trip voltage as the battery charge is going down is $V_{T1}$ and the trip voltage as the battery charge is going up is $V_{T2}$.

The monitor circuit to be described may draw as little as about 10 microamperes or even less.

Figure 2:
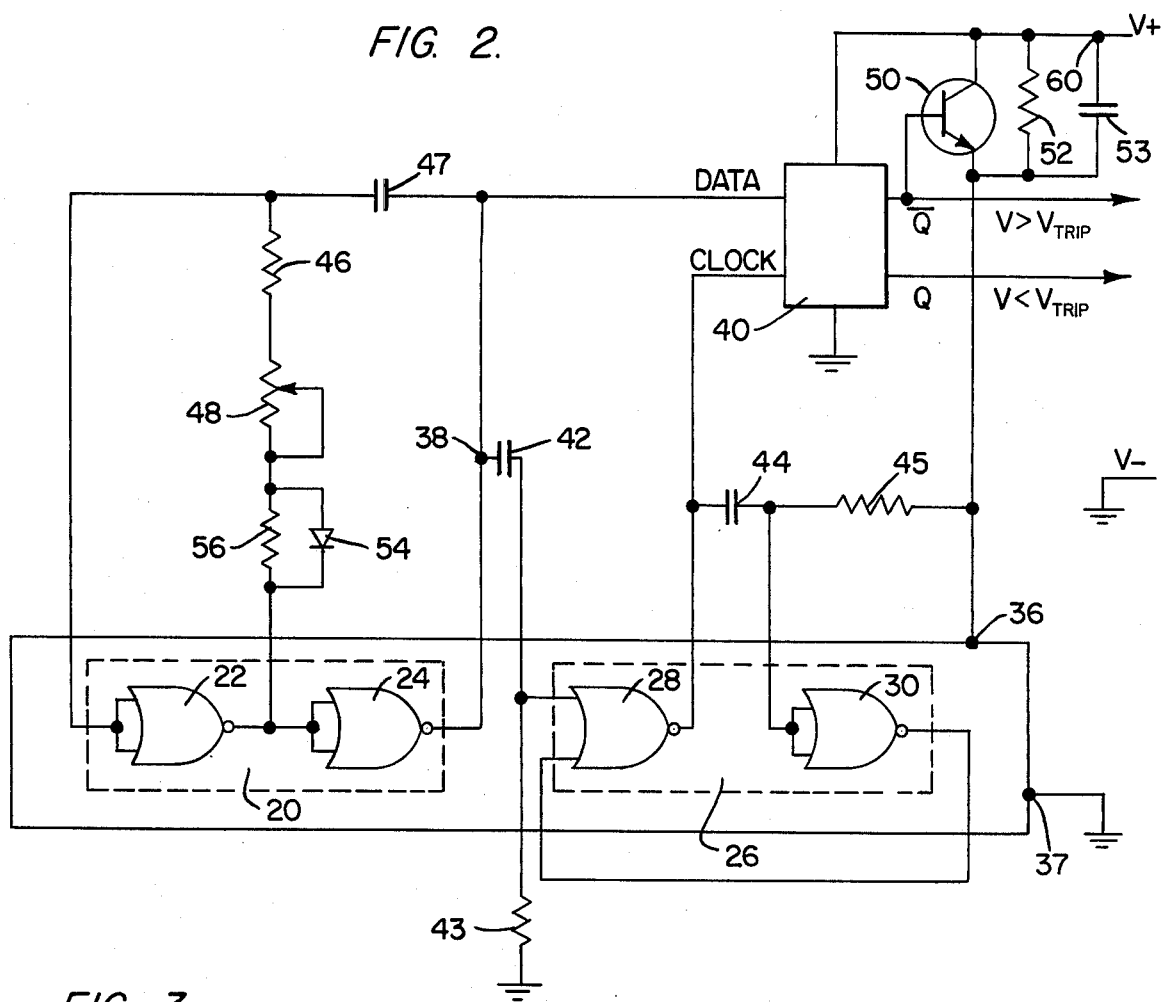
FIG. 2 illustrates in schematic form a preferred embodiment of the invention; and, FIG. 3 illustrates the digital signals of the generators and outputs of the comparison circuit.

The monitor circuit of FIG. 2 includes a first generator 20 formed by a pair of C/MOS gates 22 and 24 which may be NOR gates and a second generator 26, also formed by a pair of C/MOS gates 28 and 30 which, also, may be NOR gates. Generator 20 may be an astable multivibrator or a voltage controlled oscillator; whereas generator 26 may be an astable or monostable multivibrator whose operation is triggered by generator 20. In the present embodiment, the generator 20 is an astable multivibrator and the generator 26 is a monostable multivibrator.

Figure 3:
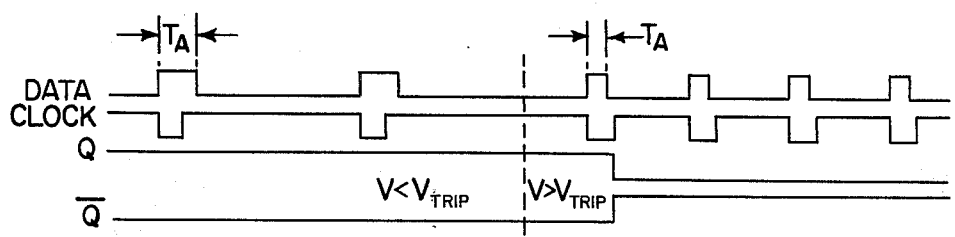

With a positive supply voltage to the gates at point 36 with respect to the voltage at ground 37 the generator 20 provides a digital signal at point 38 whose period may be seen in FIG. 3. The digital signal of generator 20 is connected to the DATA input of comparison device 40 and also coupled by a capacitive coupling network including capacitor 42 and resistor 43 to one input of gate 28. The values of the resistance and capacitance are flexible. Their time constant, however, must be long enough to reliably trigger generator 26 yet shorter than the period of the generator. The generator 26 will be triggered upon each positive going pulse from generator 20. As indicated, the negative pulse width of generator 26 remains relatively constant even if there be a change in the supply voltage at 36. The digital signal of generator 26 is connected to the CLOCK input of comparison device 40 (see FIG. 3). The capacitor 44 and resistor 45 form an RC network which set the period of the monostable multivibrator 26. In the present embodiment, the comparison device 40 compares the positive portion of the signal from generator 20 and the negative portion of the signal of generator 26. The comparison device 40 may be a positive edge triggered D-type flip-flop.

The positive period of generator 20 is adjusted by means of adjustment of the value of either the capacitor 47 or the resistive network formed by resistors 46 and 48 so that the period of each generator will be approximately equal to the other when the voltage of the battery being controlled is equal to the trip voltage ($V_{trip}$). If the battery voltage becomes greater than the trip voltage, the period $T_A$ of the generator 20 decreases. Therefore, noting FIG. 3, when the positive going edge of the signal from the generator 26 reaches the CLOCK input of flip-flop 40 the DATA input has gone low. Thus, the Q output is low and the $\overline{Q}$ output is high. On the other hand, if the battery voltage drops below the trip voltage, $V_{T2}$, the period $T_A$ of generator 20 increases, and, when the positive going edge of the output of generator 26 reaches the CLOCK input of flip-flop 40, the DATA input is still high. Thus, the Q output is high and, therefore, the $\overline{Q}$ output is low. In this manner the Q and $\overline{Q}$ signals indicate whether battery voltage is less or greater than the trip voltage.

Diode 54 and resistor 54 serve the purpose of determining the duty cycle of generator 20. Proper selection will enable achievement of a duty cycle of approximately 10% and assures that the negative pulse width of the generator 26 remains independent of the rate at which the generator is retriggered.

Circuit hysteresis is proportional to the value of resistor 52 conncted in parallel with transistor 50. As indicated, hysteresis in trip point voltage is adjustable by selection of an appropriate value for resistor 52. The capacitor 53 serves as a decoupling capacitor. Transistor 50 may be either an NPN or PNP transistor with its base connected to the $\overline{Q}$ or output, respectively.

A typical circuit may comprise, by way of example, the following components and respective values:

| | |
|---|---|
| Resistor 43 | 10 MΩ |
| Resistor 45 | 100 MΩ |
| Resistor 46 | 7.6 MΩ |
| Resistor 48 | 3 MΩ |
| Resistor 52 | 1.5 MΩ |
| Resistor 56 | 100 MΩ |
| Capacitor 42 | 250 pF |
| Capacitor 44 | 0.001 μF |
| Capacitor 47 | 3900 pF |
| Capacitor 53 | 0.01 μF |
| Transistor 50 | 2N3904 |
| Gates (22,24,28 & 30) | C/MOS logic gate (4001) |
| Flip-flop | C/MOS pos. edge triggered flip-flop (4013) |
| Diode 54 | 1N914 |

In the components shown, the battery monitor has a trip voltage of approximately 4 volts which is appropriate for three series-connected nickle-cadmium batteries at full charge. Hysteresis is about 0.2V and the current drain is less than about 10 microamps when the battery voltage exceeds the trip voltage and less than about 5 microamps when the battery voltage is less than the trip voltage.

In operation, the voltage of the charged battery is impressed at point 60. In this state, the transistor is "On" and a substantially equal voltage is felt at point 36. This is the applied voltage to generators 20 and 26. During this state of operation the period of the astable multivibrator 20 is less than the period of the monostable multivibrator 26. The $\overline{Q}$ output of flip-flop 40, therefore, is high and transistor 50 remains "On". If the battery voltage drops toward the trip voltage, $V_{T1}$, the period of generator 20 incrases to approximately the period of generator 26, and then surpasses the period of generator 26 causing $\overline{Q}$ output of flip-flop 40 to go low and transistor 50 to shut off. At this point, the voltage at point 36 is lower than the applied voltage at point 60 by a factor of the voltage drop across resistor 52. This causes the period of generator 20 to further increase and ensures stable low $\overline{Q}$ condition. If the battery is charged to a value of $V_{T2}$ which is equal to $V_{T1}$ plus the hysteresis value then the voltage at point 36 will be again the value at which the period of generator 20 equals the period of generator 26. Any further increase in voltage causes the circuit to switch to the $\overline{Q}$ high condition which turns "On" transistor 50. This further increases the voltage at point 36 ensuring a stable high $\overline{Q}$ condition.

The foregoing operation is achieved by provision of two generators 20 and 26, the former of which has a period which changes more with an applied voltage than does that of generator 26.

The foregoing monitor circuit may be interfaced with any one of various external circuits providing the ability to drive an external signalling device, i.e., a lamp, a light emitting diode, etc., and/or a control device.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

Having described the invention, what is claimed is:

1. A low power apparatus for monitoring a variable supply voltage comprising a first means for producing a digital signal in response to the voltage level of the variable supply voltage, a second means for producing a digital signal also in response to the voltage level of the variable supply voltage, the digital signal of one of the first and second means varying to a greater degree than the digital signal of the other of said means in response to the same voltage level variation, and a comparison means for comparing the two digital signals and thereby determining supply voltage level information.

2. The apparatus of claim 1 wherein the digital signal of said first means which comprises an astable multivibrator varies to a degree greater than the digital signal of the second means.

3. A low power apparatus for monitoring a variale supply voltage comprising a first means formed by an astable multivibrator for producing a digital signal in response to the voltage level of the variable supply voltage, a second means formed by a monostable multivibrator for producing a digital signal also in response to the voltage level of the variable supply voltage and triggered by the digital signal of said astable multivibrator, the digital signal of said astable multivibrator varying to a greater degree than the digital signal of the monostable multivibrator in response to the same voltage level variation, and a comparison means for comparing the two digital signals and thereby determining supply voltage level information.

4. The apparatus of claim 3 further comprising means for initially adjusting the positive period of said astable multivibrator.

5. The apparatus of claim 3 including means for providing a hysteresis effect, said means being controlled by an output of said comparison network.

6. The apparatus of claim 5 wherein said hysteresis means includes a transistor and a resistor connected in parallel network, said network connected to said voltage supply.

* * * * *